United States Patent
Duncan et al.

(10) Patent No.: US 9,683,902 B2
(45) Date of Patent: Jun. 20, 2017

(54) TEMPERATURE SENSING ARRANGEMENT, METHOD OF MAKING THE SAME AND METHOD OF SENSING TEMPERATURE

(71) Applicants: Roger Glen Duncan, Christiansburg, VA (US); Brooks A. Childers, Christiansburg, VA (US); Paul F. Wysocki, Blacksburg, VA (US)

(72) Inventors: Roger Glen Duncan, Christiansburg, VA (US); Brooks A. Childers, Christiansburg, VA (US); Paul F. Wysocki, Blacksburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 856 days.

(21) Appl. No.: 13/744,044

(22) Filed: Jan. 17, 2013

(65) Prior Publication Data

US 2014/0198823 A1 Jul. 17, 2014

(51) Int. Cl.
*G01J 5/00* (2006.01)
*G01K 13/00* (2006.01)
*G01N 25/00* (2006.01)
*G01K 11/32* (2006.01)
*G01K 5/48* (2006.01)

(52) U.S. Cl.
CPC .............. *G01K 11/32* (2013.01); *G01K 5/48* (2013.01); *Y10T 29/49826* (2015.01)

(58) Field of Classification Search
USPC .................... 374/136, 131, 45, 46
See application file for complete search history.

(56) References Cited

U.S. PATENT DOCUMENTS

| 4,950,886 A | * | 8/1990 | Claus | G01D 5/268 250/227.14 |
|---|---|---|---|---|
| 5,163,321 A | * | 11/1992 | Perales | 73/152.52 |
| 6,462,329 B1 | | 10/2002 | Davis et al. | |
| 6,698,919 B2 | * | 3/2004 | Chi et al. | 374/45 |
| 2002/0159499 A1 | * | 10/2002 | Ruffa | 374/161 |
| 2003/0053783 A1 | | 3/2003 | Shirasaki | |
| 2003/0174924 A1 | * | 9/2003 | Tennyson | G01D 5/35383 385/12 |
| 2004/0184750 A1 | * | 9/2004 | Shahar | G02B 6/125 385/122 |
| 2006/0245469 A1 | * | 11/2006 | Koeniger | 374/208 |

(Continued)

FOREIGN PATENT DOCUMENTS

| JP | 09229781 A | 5/1997 |
|---|---|---|
| WO | 0039548 A2 | 9/2000 |

OTHER PUBLICATIONS http://www.mt-berlin.com/frames_cryst/descriptions/quartz%20.htm; "Crystal Quartz (SiO2) and Fused Silica", no date.*
http://www.engineeringtoolbox.com/linear-expansion-coefficients-d_95.htm; "The Engineering Toolbox, Coefficients of Linear Thermal Expansion", no datel.*

(Continued)

*Primary Examiner* — Mirellys Jagan
(74) *Attorney, Agent, or Firm* — Cantor Colburn LLP

(57) ABSTRACT

A temperature sensing arrangement includes a member having a first coefficient of thermal expansion, and an optical fiber having a second coefficient of thermal expansion. The optical fiber is strain transmissively mounted to the member. And the first coefficient of thermal expansion is greater than the second coefficient of thermal expansion such that strain measurable in the optical fiber is correlatable to temperature changes in the member.

11 Claims, 1 Drawing Sheet

(56) References Cited

U.S. PATENT DOCUMENTS

| | | | |
|---|---|---|---|
| 2008/0253428 A1* | 10/2008 | MacDougall | G01K 11/32 374/137 |
| 2009/0279583 A1* | 11/2009 | Hampson | G01K 1/14 374/131 |
| 2010/0080501 A1* | 4/2010 | Saunders | G01D 5/35383 385/12 |
| 2011/0044373 A1* | 2/2011 | Lagakos | G01K 5/62 374/188 |
| 2011/0188537 A1* | 8/2011 | Tam | G01D 5/35303 374/161 |
| 2012/0039358 A1* | 2/2012 | Bosselmann | E21B 47/065 374/161 |
| 2012/0044971 A1* | 2/2012 | Omichi et al. | 374/161 |
| 2012/0120985 A1* | 5/2012 | Zhou et al. | 374/161 |
| 2012/0155508 A1* | 6/2012 | Dria | E21B 43/164 374/107 |
| 2013/0034324 A1* | 2/2013 | Laing et al. | 385/13 |
| 2013/0188168 A1* | 7/2013 | Hartog et al. | 356/32 |
| 2014/0198823 A1 | 7/2014 | Duncan et al. | |
| 2016/0084719 A1* | 3/2016 | Ivasauskas | G01K 11/32 374/161 |

OTHER PUBLICATIONS

"Teflon" to WS Hampshire (no date).*

:Fused Silica Material Properrties to Accuratus (no date).*

Thermal Expansioon Coefficient of Stainless Steel to LucasMilhaupt.*

Hadley, et al., "Distributed Temperature Sensor Measures Temperature Resolution in Real Time"; Society of Petroleum Engineers; Conference Paper SPE 116665; SPE Annual Technical Conference and Exhibition, 2008; pp. 1-10.

J.G. Pearce, et al., "High Resolution, Real-Time Casing Strain Imaging for Reservoir and Well Integrity Monitoring: Demonstration of Monitoring Capability in a Field Installation"; Society of Petroleum Engineers; Conference Paper SPE 124932; 2009 SPE Annual Technical Conference and Exhibition; Oct. 4-7, 2009; pp. 1-15.

Li, et al., "Using Fiber Bragg Grating in Geothermal Monitoring"; Rock Stress and Earthquakes—Xie (ed.); Taylor and Francis Group, 2010; pp. 815-817.

International Search Report and Written Opinion; International Application No. PCT/US2013/074596; International Filing Date: Dec. 12, 2013; Date of Mailing: Mar. 27, 2014; 10 Pages.

* cited by examiner

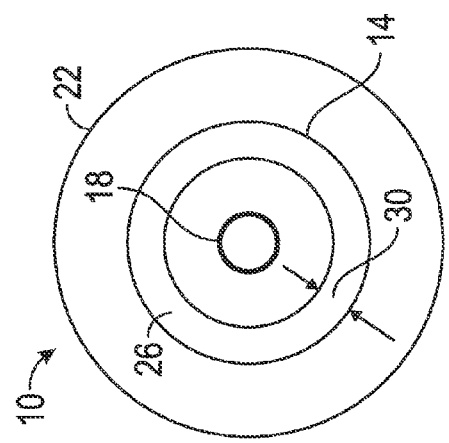
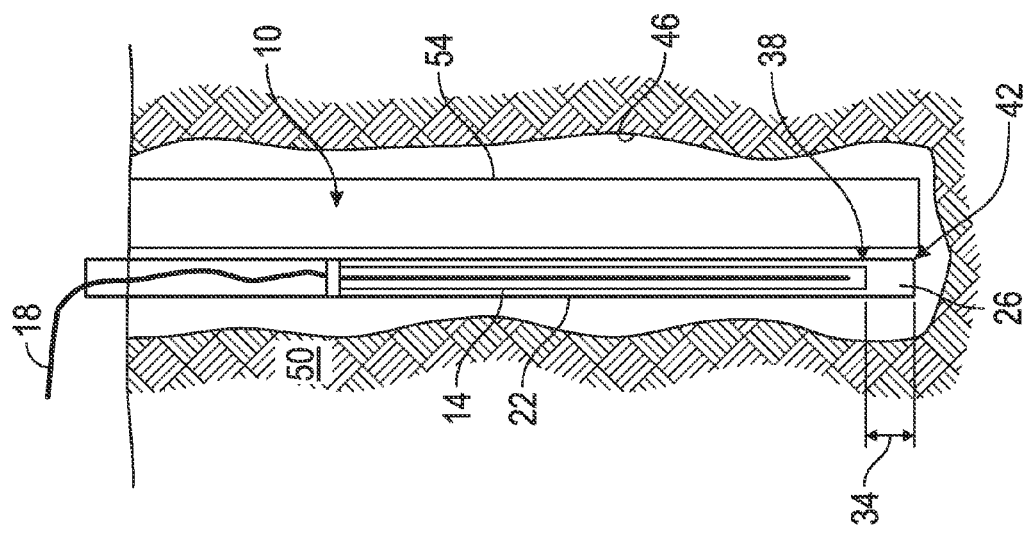

TEMPERATURE SENSING ARRANGEMENT, METHOD OF MAKING THE SAME AND METHOD OF SENSING TEMPERATURE

BACKGROUND

Systems that employ optical fibers are commonly used to measure temperature along the length of the fiber. These systems rely on light being reflected or refracted responsive to temperature at points there along returning to an end of the optical fiber for determining temperature at the points. Such systems include those employing Bragg gratings; Brillouin based distributed temperature sensing and distributed temperature sensing using the Raman Effect, for example. Strain along an optical fiber, however, also causes some of the light to be reflected or refracted and returned to the end. This alteration of light traveling through the fiber due to strain can have a detrimental effect on accuracy of the temperature measurements made with the fiber. Methods and systems that minimize these detrimental effects on measurement accuracy will be well received by those who practice in the art.

BRIEF DESCRIPTION

Disclosed herein is a temperature sensing arrangement. The arrangement includes a member having a first coefficient of thermal expansion, and an optical fiber having a second coefficient of thermal expansion. The optical fiber is strain transmissively mounted to the member. And the first coefficient of thermal expansion is greater than the second coefficient of thermal expansion such that strain measurable in the optical fiber is correlatable to temperature changes in the member.

Further disclosed herein is a method of determining temperature along a member. The method includes correlating strain measured in an optical fiber to temperature changes in a member. The optical fiber is strain transmissively attached to the member and the member has a first coefficient of thermal expansion that is greater than a second coefficient of thermal expansion of the optical fiber. The method further includes measuring strain in the optical fiber and attributing temperature values to the member that correlate with the strain measured in the optical fiber.

BRIEF DESCRIPTION OF THE DRAWINGS

The following descriptions should not be considered limiting in any way. With reference to the accompanying drawings, like elements are numbered alike:

FIG. 1 depicts a cross sectional view of a temperature sensing arrangement disclosed herein; and FIG. 2 depicts an alternate cross sectional view of the temperature sensing arrangement of FIG. 1.

DETAILED DESCRIPTION

A detailed description of one or more embodiments of the disclosed apparatus and method are presented herein by way of exemplification and not limitation with reference to the Figures.

Referring to FIGS. 1 and 2, an embodiment of a temperature sensing arrangement is illustrated at 10. The temperature sensing arrangement 10 includes a member 14 shown herein as a tubular and an optical fiber 18 that is strain transmissively attached to the member 14. Strain "transmissively attached" as employed herein means to rigidly attach or strain lock the items to one another so that strain experienced by one is experienced by the other. The member 14 has a first coefficient of thermal expansion and the optical fiber 18 has a second coefficient of thermal expansion and the first coefficient of thermal expansion is greater than the second coefficient of thermal expansion. The arrangement 10 thereby has a strong correlation between strain measured in the optical fiber 18 and temperature changes in the member 14.

Improved sensitivity of the temperature sensing arrangement 10 is due, in part, to the optical fiber 18 being more sensitive to strain than to changes in temperature and to selection of a material for the member 14 that has a significantly higher coefficient of thermal expansion than that of the optical fiber 18. Use of a metal, such as Nickel or a Nickel alloy, for example, for the member 14 can yield a configuration that has the member 14 with a factor of three or more times the coefficient of thermal expansion of the optical fiber 18.

Strain transmissively attaching the optical fiber 18 to the member 14 can be accomplished in different ways. For example, the optical fiber 18 can be adhered to the member 14 via an adhesive such as epoxy, or through an interference fit between the two components. Both of these methods of attachment can be facilitated by positioning the optical fiber 18 in a center of the tubular member 14, as illustrated herein, thereby increasing surface areas of each that are in contact with the other. Such a configuration minimizes strain imparted on the optical fiber 18 by any means other than that imparted to the optical fiber 18 by the member 14.

Sensitivity of the temperature sensing arrangement 10 is further enhanced by minimizing strain imparted on the member 14 by anything other than temperature changes experienced by the member 14. A housing 22, illustrated herein as a tubular surrounding the member 14, protects the member 14 from contacting structures that could impart non-temperature related strain to the member 14. Positioning a fluid 26 in an annular space 30 defined between the member 14 and the housing 22 further isolates the member 14 from undesirable inputs of strain. A longitudinal gap 34 provided between an end 38 of the member 14 and an end 42 of the housing 22 can assure that the member 14 has sufficient room to grow longitudinally with changes in temperature without the ends 38 of the member 14 making contact with the end 42 of the housing 22.

When used in a borehole 46 in an earth formation 50 such as are employed in the hydrocarbon recovery and the carbon dioxide sequestration industries the housing 22 can be a control line attachable to a tool 54, such as a drill string, for example, run within the borehole 46. Thereby allowing for accurate temperature determination along the length of the tool 54. Alternately, the member 14 can be a control line and deployed along the tool 54 without the housing 22, as long as care is taken to attach the member 14 to the tool 54 so as to minimize strain imparted to the member 14 by the tool 54.

Accuracy of the temperature sensing arrangement 10 disclosed herein can further be enhanced by intentionally varying temperature of the optical fiber 18 and member 14 assembled together and mapping strain sensed by the optical fiber 18 in response to the temperature variations. This mapping allows temperature changes in the member 14 to be correlated to strain measurements made with the optical fiber 18. Subsequently, an operator can attribute temperature values to the member 14 to strain measured in the optical fiber 18.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A temperature sensing arrangement comprising:
    a metal member having a first coefficient of thermal expansion;
    an optical fiber having a second coefficient of thermal expansion being strain transmissively mounted to the member, the first coefficient of thermal expansion being greater than the second coefficient of thermal expansion such that strain measurable in the optical fiber is correlatable to temperature changes in the member, the mounting of the optical fiber to the member being configured to minimize strain imparted to the optical fiber by means other than that imparted to the optical fiber by the member; and
    a housing in protective communication with the member and the optical fiber and configured to isolate strain exhibited in the housing from reaching the member and the optical fiber.

2. The temperature sensing arrangement of claim 1, wherein the optical fiber is more sensitive to changes in strain than to changes in temperature.

3. The temperature sensing arrangement of claim 1, wherein the member surrounds the optical fiber.

4. The temperature sensing arrangement of claim 1, wherein the member is tubular.

5. The temperature sensing arrangement of claim 1, wherein the member is a control line.

6. The temperature sensing arrangement of claim 1, wherein the housing is a tubular.

7. The temperature sensing arrangement of claim 1, wherein the housing is a control line.

8. The temperature sensing arrangement of claim 1, wherein the housing surrounds the member.

9. The temperature sensing arrangement of claim 8, wherein a fluid is positioned in a space between the member and the housing.

10. A method of determining temperature along a member, comprising:
    correlating strain measured in an optical fiber to temperature changes in a metal member, the optical fiber being strain transmissively attached to the member, the member having a first coefficient of thermal expansion greater than a second coefficient of thermal expansion of the optical fiber, the optical fiber and the member being isolated from strain in a housing protecting the optical fiber and the member;
    measuring strain in the optical fiber; and
    attributing temperature values to the member that correlate with the strain measured in the optical fiber.

11. A method of making a temperature sensing arrangement, comprising:
    strain transmissively mounting an optical fiber to a metal member having a greater coefficient of thermal expansion than that of the optical fiber;
    protecting the optical fiber and the member with a housing;
    isolating strain in the housing from being imparted on the optical fiber and the member;
    varying temperature of the optical fiber and the member; and
    mapping strain sensed by the optical fiber in response to temperature variations in the member.

* * * * *